Figure 1:
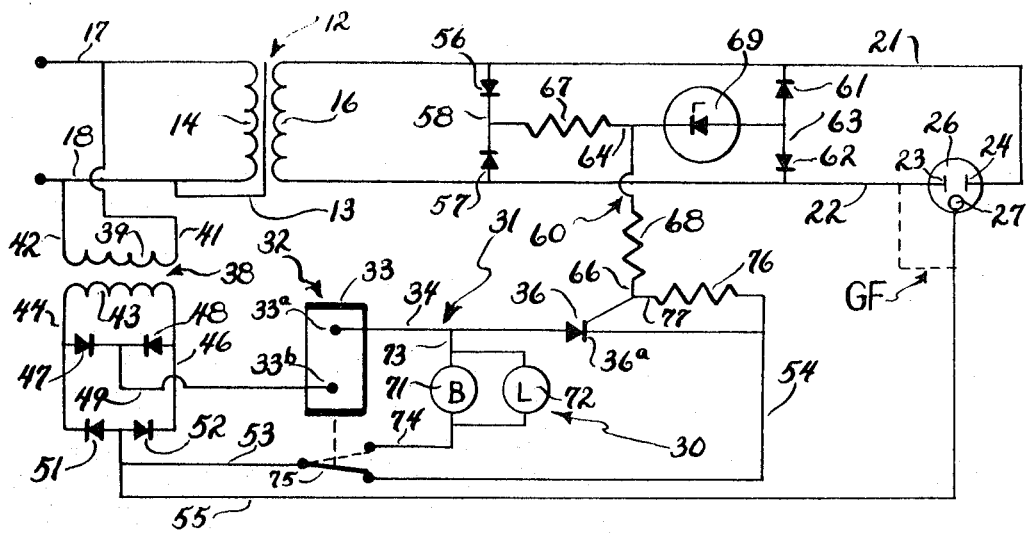

United States Patent
Rogers, Sr. et al.

[15] 3,665,252
[45] May 23, 1972

[54] ELECTRICAL PROTECTIVE CIRCUIT

[72] Inventors: Charles J. Rogers, Sr., 1312 Coosaw Drive, Charleston, S.C. 29411; Paul E. Stanley, 100 Hideway Lane, West Lafayette, Ind. 47906

[22] Filed: July 17, 1970

[21] Appl. No.: 55,788

[52] U.S. Cl..........................317/18 D, 317/33 SC, 340/255
[51] Int. Cl.......................................................H02h 3/16
[58] Field of Search...............317/18 D, 33 SC, 18; 340/255

[56] References Cited

UNITED STATES PATENTS

| | | | |
|---|---|---|---|
| 3,515,942 | 6/1970 | Gordon | 317/18 D |
| 3,441,801 | 4/1969 | Kraus | 317/18 |
| 3,253,188 | 5/1966 | Nissel | 317/18 D |
| 3,450,947 | 6/1969 | Rogers | 317/18 |
| 3,436,599 | 4/1969 | Rogers | 317/18 D |

Primary Examiner—James D. Trammell
Attorney—T. Russell Foster

[57] ABSTRACT

A protective circuit for an isolated load circuit utilizing an isolation transformer having a primary winding connected to an associated source of power and a secondary winding connected to a load by a pair of load conductors which includes fault condition responsive means, a normally inoperative control circuit having a normally open electrical valve and a relay connected to the source of electrical power by an auxiliary transformer with an auxiliary circuit connected to the control circuit and to the load conductors for closing the valve at a predetermined voltage to operatively condition the control circuit upon the presence of a ground fault on one of the load conductors to energize the relay and actuate the fault condition responsive means.

2 Claims, 2 Drawing Figures

Patented May 23, 1972  3,665,252

INVENTORS
Charles J. Rogers, Sr.
Paul E. Stanley
BY
Russell Foster
ATTORNEY

ELECTRICAL PROTECTIVE CIRCUIT

This invention relates to an electrical safety circuit and more particularly to such a circuit for providing ground fault protection in an electrical distribution system.

Many types of circuits have been proposed for providing protection against personal injury and property damage in electrical power distribution systems such as are commonly found in residential construction, industrial plants and the like. One type of such safety circuits by means which outstanding results have been obtained in preventing personal injury and property damage in an electrical distribution system is the circuit described and claimed in U.S. Pat. No. 3,242,382 issued to C. J. Rogers Sr.

Although the circuit of the aforementioned patent provides outstanding protection certain areas, for instance, hospitals, where the use of electrical devices in operating rooms and the like is assuming an ever increasing importance, a very small magnitude of fault current and/or voltage must be detected to avoid personal injury. For instance, leakage current as low as 20 microamps or even lower must be detected to insure absolute safety. Even with an extremely low leakage current, the sensitivity of a patient undergoing an operation such as a heart operation which requires the use of many electrical devices available today, is such that electrical hazards are always present endangering the patients life. In addition, the detection of such a very low fault current with ground fault interrupters in use today including the circuit of the aforementioned patent is very difficult and has not been accomplished with the desired degree of success. Furthermore, interrupting the load circuit to such electrical devices upon the detection of a ground fault current is not practical for medical use in that the continuous functioning of the electrical devices in hospitals and the like is required although the presence of a ground fault should be known immediately so that corrective measure can be taken as soon as practical.

Accordingly, a primary object of this invention is to provide a new and novel electrical protective circuit for a power distribution system.

Another object of this invention is to provide a new and novel electrical protective circuit for signaling the presence of a ground fault on a power distribution system without disconnecting the load.

A further object of this invention is to provide a new and novel electrical protective circuit for detecting the presence of a ground fault on a power distribution system which is completely isolated from the power circuit by transformers.

Still another object of this invention is to provide a new and novel electrical protective circuit for a power distribution system which detects extremely low fault currents in the system and which may be actuated at any selected ground fault voltage over a wide range.

Still another object of this invention is to provide a new and novel electrical protective circuit for a power distribution system which is extremely reliable and stable, which utilizes a minimum of inexpensive readily available components and which may be adapted for either signaling or load circuit interruption upon the presence of a ground fault on the system.

This invention further contemplates the provision of a new and novel electrical protective circuit which is particularly adapted for use in the systems distributing power to electrically operated devices used in hospitals, particularly operating rooms to eliminate injury and even death to patients from fault currents as low as two microamperes but which permits continuous use of such power while signaling the presence of a fault condition.

In general, the objects of this invention and related objects are accomplished by providing an isolation transformer having a primary winding connected by a pair of line conductors to an associated source of electrical power and a secondary winding connected by a pair of load conductors to a load. The circuit includes fault condition responsive means for actuation by a normally inoperative control circuit and means are provided for connecting the control circuit to said source of electrical power and to ground. An auxiliary circuit is provided which is connected to the control circuit and to the load conductors so that upon the presence of a ground fault on one of the load conductors, the auxiliary circuit provides a ground fault circuit for operatively conditioning the control circuit for actuation of the fault condition responsive means.

Figure 2:
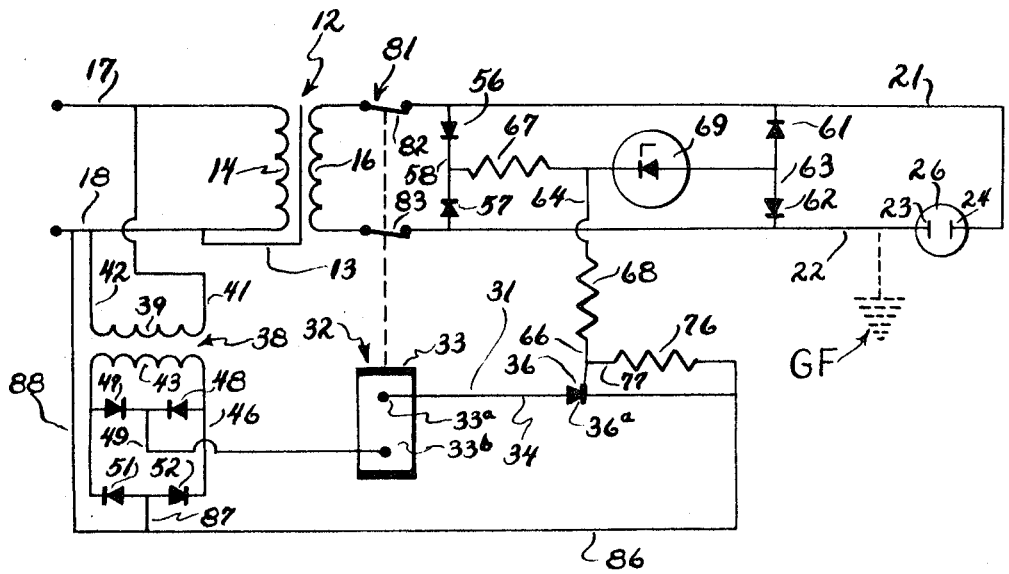

The novel features which are believed to be characteristic of the invention are set forth with particularity in the appended claims. The invention itself, however, both as to its organization and method of operation may be best understood by reference to the following description taken in conjunction with the accompanying drawings in which:

FIG. 1 is a schematic wiring diagram of an electrical protective circuit constructed in accordance with the invention; and FIG. 2 is a schematic wiring diagram of a modification of the circuit of FIG. 1.

Referring now to FIG. 1 there is shown one embodiment of the protective circuit of the invention which is utilized in connection with a power distribution system for connecting a load to a source of electrical power. The circuit of FIG. 1 includes an isolation transformer designated generally by the numeral 12 preferably provided with a shield 13 of conventional type and having a primary winding 14 and a secondary winding 16. The primary winding 14 is arranged to be connected to an associated source of electrical power (not shown) by means of line conductors 17, 18. The isolation transformer 12 is preferably of the type having a 1:1 winding ratio so as to provide the same voltage across both the primary and secondary windings 14, 16.

The transformer secondary winding 16 is arranged to be connected to a load (not shown) by means of load conductors 21, 22 connected as shown to the terminal slots 23, 24 of a wall receptacle 26 or, if desired, the conductors 21, 22 may be connected to a receptacle of the anesthetizing location type such as described in NFPA Standard No. 56, FIG. A 2438. In the embodiment of FIG. 1, the receptacle 26 is of conventional construction having, in addition to the slots 23, 24, a ground plug slot 27 so that the slots 23, 24 and 27 are arranged to receive the three prongs of a conventional plug by means of which a load such as an electrical instrument, device or the like is connected to the load conductors 21, 22.

The circuit of the invention includes fault condition responsive means which in the embodiment of FIG. 1 comprise signaling means designated generally by the numeral 30 for signaling the presence of a ground fault on one of the load conductors 21, 22. The circuit of FIG. 1 includes a normally inoperative control circuit for actuating the fault condition responsive means or signaling means 30. More specifically, the control circuit designated generally by the numeral 31, includes a relay 32 having a coil 33 operatively associated with the signaling means 30. The relay coil 33 is provided with terminals 33a, 33b and one side of the relay coil or terminal 33a is connected by means of conductor 34 to one side of a normally open electrical valve 36 for maintaining the control circuit 31 in a normally inoperative condition. In the illustrated embodiment, the electrical valve 36 is preferably a silicon controlled rectifier or SCR having a gate 36a.

Means are provided for connecting the control circuit to the associated source of electrical power and to ground. More specifically, an auxiliary transformer designated generally by the numeral 38 is provided having a primary winding 39 connected by means of conductors 41, 42 to line conductors 17, 18 which, as described above, are connected to the associated source of electrical power. The auxiliary transformer 38 has a secondary winding 43 and means are provided for connecting the secondary winding 43 to the control circuit 31 or, more specifically, to the other side or terminal 33b of the relay coil 33 and to the other side or gate 36a of the electrical valve or SCR 36.

More specifically, a pair of conductors 44, 46 are connected to the ends of the secondary winding 43 and a first pair of reversely positioned half-wave rectifiers or diodes 47, 48 are connected at their opposite sides to the conductors 44, 46 respectively. The corresponding sides of the diodes 47, 48 are connected together and to the relay coil terminal 33b by means of conductor 49.

A second pair of half-wave rectifiers or diodes 51, 52 are provided which are reversely positioned oppositely from the position of the first pair of rectifiers 47, 48 and have their opposite sides connected to the conductors 44, 46. The corresponding sides of the rectifiers 51, 52 are connected together and to the SCR gate 36a by means of conductors 53, 54.

Means are provided for grounding the control circuit 31 which in the embodiment in FIG. 1 includes a grounding conductor 55 connected to conductor 53 and to the grounding slot 27 on the receptacle 26 as shown. The protective circuit of the invention also includes an auxiliary circuit, designated generally by the numeral 60, connected to the control circuit 31 and to the load conductors 21, 22. More specifically, the auxiliary circuit 60 includes a first pair of reversely positioned half-wave rectifiers or diodes 56, 57 which are connected at their opposite sides to the load conductors 21, 22 respectively the corresponding sides of the diodes 56, 57 being connected together by means of conductor 58. A second pair of half-wave rectifiers or diodes 61, 62, reversely positioned oppositely from the position of the first pair of rectifiers 56, 57 are provided in the auxiliary circuit 60 and have their opposite sides connected to the load conductors 21, 22 respectively. The corresponding sides of the diodes 61, 62 are connected together by means of conductor 63 and to corresponding sides of the first pair of diodes 56, 57 by means of conductor 64. The corresponding sides of both pair of diodes 56, 57 and 61, 62 are connected to the SCR gate 36a by means of conductor 66 connected as shown to conductor 64. Resistances 67, 68 are preferably provided in conductors 64, 68 respectively for limiting the current flow therethrough as will be explained hereinafter.

Means are provided in the auxiliary circuit 60 for limiting the voltage in a ground fault circuit to a predetermined magnitude. More specifically, a zener diode 69 is provided in conductor 64 so that the zener diode is connected at one side to the corresponding sides of the pair of diodes 61, 62 by means of conductor 63. The other side of the zener diode 69 is connected to the corresponding sides of diodes 56, 57 and the SCR gate 36a by means of conductors 64, 66 respectively.

The signaling means 30 which is preferably electrically operated, includes an audible signal 71 such as a bell and a visual signal 72 such as a light connected in parallel as shown. One side of the signals 71, 72 is connected by means of conductor 73 to the one side or terminal 33a of the relay coil 33. The other side of the signals 71, 72 is arranged to be connected to the auxiliary transformer secondary winding 43 by means of a conductor 74 and a switch 75 operatively associated with the relay 32 and arranged to interconnect conductors 53, 54. The switch 75 is preferably of the double pole, double throw (SPT) type and is normally maintained in the solid line position of FIG. 1 for normally disconnecting the other side of the signals 71, 72 from the secondary winding 43 and for normally interconnecting the conductors 53, 54 to connect the SCR gate 36a to the secondary winding 43. The switch 75 is movable by the relay 32 into the dotted line position of FIG. 1 for connecting together conductors 53, 74 to connect the signals 71, 72 to the secondary winding 43. Preferably, a resistor 76 is connected by means of a conductor 77 to conductors 66, 54.

Referring now to FIG. 2 there is shown a modification of the circuit of FIG. 1 wherein like numerals have been used to identify like parts. In the circuit of FIG. 2, the signaling means 30 of FIG. 1 have been eliminated and normally closed switching means have been provided for disconnecting the load from the source of power upon the operative conditioning of the control circuit. More specifically, the normally closed switching means, designated generally by the numeral 81, includes a pair of gang operated switches 82, 83 by means of which load conductors 21, 22 are connected to the secondary winding 16 of the transformer 12. The switching means 81 is operatively associated with the relay 32 so that the switches 82, 83 are maintained in the normally closed position of FIG. 2.

The auxiliary transformer secondary winding 43 is connected to the SCR gate 36a by a conductor 86 connected by means of a conductor 87 to the corresponding sides of the diodes 51, 52 and the control circuit 31 is grounded by a grounding conductor 88 connected at one end to conductors 86, 87 and at its other end to the ground conductor 18 connected to the primary winding 14 of transformer 12 and to the associated source of electrical power.

In the operation of the circuit of FIG. 1, the presence of a ground fault on one of the load conductors 21, 22 is identified by the letters GF and shown in broken lines between the load conductor 22 and the grounding conductor 55. Such a ground fault may be in the form of a relatively small leakage current. As a result of the presence of the ground fault GF, a ground fault circuit is established in the auxiliary circuit 60 so that current flows through load conductor 22, through the secondary winding 16, conductor 21, diode 56, conductors 58, 64 and 66, the SCR gate 36a, conductor 54, switch 75, conductor 53 the grounding conductor 55 and through the ground fault GF back to load conductor 22. The zener diode 69 clips the voltage in this ground fault circuit to the voltage level as established by the rating of the zener diode. For instance, a 6 volt rated zener diode limits the voltage in the ground fault circuit to 6 volts.

When the current in the ground fault circuit reaches a predetermined level, in accordance with the rating of the SCR 36, the value of resister 76 and the various other resistors in the ground fault circuit the current applied to the SCR gate 36a fires the SCR so as to permit current to flow in the control circuit, power being obtained from the secondary winding 43 of the auxiliary transformer 38. By way of example, current flows in the control circuit 31 from the right hand side of the secondary winding 43 through conductor 46, diode 48, conductor 49, relay coil 33, SCR 36, conductor 54, switch 75, conductor 53, diode 51 conductor 44, and through the secondary winding 43 from the other side. The relay coil 33 is then energized to actuate switch 75 moving it from the solid line position to the dotted line connecting the signals 71, 72 across the secondary winding 43 so that audible and visual signals are obtained indicating the presence of the ground fault GF on the conductor 22. In the same manner, a ground fault on load conductor 21 results in a similar operation of the circuit and an energization of the signaling means 30.

In the embodiment of FIG. 2, a ground fault on load conductor 22 designated also by GF in FIG. 2, produces energization of relay coil 33 for actuating the switching means 81 so that the switches 82, 83 move to the open position disconnecting the load conductors 21, 22 from the source of power. In the circuit of FIG. 2, the ground fault circuit is completed through conductor 88 connected as described above to the grounded line conductor 18.

While there has been described what at present is considered to be the preferred embodiment of the invention, it will be understood by those skilled in the art that various changes and modifications may be made therein without departing from the invention.

Having thus described the invention what is claimed is:

1. An electrical protective circuit for a power distribution system comprising, in combination, a transformer having a primary winding and a secondary winding, a pair of line conductors for connecting said primary to an associated source of electrical power, a pair of load conductors for connecting said secondary winding to an electrical load, an auxiliary circuit connected to said load conductors, a normally inoperative control circuit connected to said auxiliary circuit, means including an auxiliary transformer for connecting said control circuit to said line conductors, fault condition responsive means connected to said control circuit, means for grounding said control circuit, said auxiliary circuit being arranged to provide a ground fault circuit upon the presence of a ground fault on one of said load conductors for operatively conditioning said control circuit for actuation of said fault condition responsive means, and means in said auxiliary circuit for limiting the voltage in said ground fault circuit to a predetermined magnitude, a silicon controlled rectifier having a gate in said control circuit in said normally inoperative condition and wherein said gate is connected to said auxiliary circuit for actuation of said control circuit at a predetermined magnitude of fault current, said auxiliary circuit comprising a first pair of reversely positioned rectifiers having corresponding sides connected together and each connected at their opposite sides to one of said load conductors, a second pair of rectifiers reversely positioned oppositely from the position of said first pair of rectifiers and having corresponding sides connected together and each connected at their opposite sides to one of said load conductors, and wherein said means for limiting the voltage in said ground fault circuit comprises a zener diode connected at one side to the corresponding sides of said second pair of reversely positioned rectifiers and means for connecting the other side of said zener diode to the corresponding sides of said first pair of reversely positioned rectifiers and to said silicon controlled rectifier gate.

2. An electrical protective circuit in accordance with claim 1 wherein said control circuit includes a relay having a coil operatively associated with said fault condition responsive means and wherein said fault condition responsive means comprises an electrically operatied signal having one side connected to one side of said relay coil, means including a switch operatively associated with said relay for connecting the other side of said signal to said auxiliary transformer, means for connecting said switch to said silicon controlled rectifier, said switch being normally maintained in one position for disconnecting said signal the other side from said auxiliary transformer and for connecting the other side of said silicon controlled rectifier to said auxiliary transformer, said switch being movable by said relay into a second position upon the operative conditioning of said control circuit for interrupting said auxiliary circuit and for connecting said signal to said auxiliary transformer.

* * * * *